Walter Haeussermann,
INVENTOR.

BY S. J. Rotondi,
A. T. Dupont,
V. L. Billings, and
Alvin E. Moore,

ATTORNEYS.

Feb. 28, 1961  W. HAEUSSERMANN  2,973,162
ATTITUDE CONTROL SYSTEM FOR SPACE VEHICLES
Filed Feb. 12, 1959  10 Sheets-Sheet 8

Walter Haeussermann,
INVENTOR.

Feb. 28, 1961 W. HAEUSSERMANN 2,973,162
ATTITUDE CONTROL SYSTEM FOR SPACE VEHICLES
Filed Feb. 12, 1959 10 Sheets-Sheet 10

Walter Haeussermann,
INVENTOR.
BY S. J. Rotondi,
A. T. Dupont,
V. L. Billings, and
Alvin E. Moore,
ATTORNEYS.

United States Patent Office 2,973,162
Patented Feb. 28, 1961

2,973,162
ATTITUDE CONTROL SYSTEM FOR SPACE VEHICLES
Walter Haeussermann, 1607 Sandlin St. SE., Huntsville, Ala.
Filed Feb. 12, 1959, Ser. No. 792,930
18 Claims. (Cl. 244—1)
(Granted under Title 35, U.S. Code (1952), sec. 266)

The invention described herein may be manufactured and used by or for the Government for governmental purposes without the payment of any royalty thereon.

This invention relates to an attitude control system for space vehicles. The construction of such a system for the control of a space craft, satellite, or the final stage of a ballistic missile involves a number of inventive problems.

One of these problems results from the near vacuum or vacuum of space and the consequent lack of ambient air or other material for steering co-action with vanes, ailerons or mechanical propellers. This condition leads to a necessity, in the present status of technology, of steering or otherwise attitude-controlling a satellite or space vehicle either by reaction jets that exert couples about the yaw, pitch and roll axes or by mechanical movement within the vehicle of mechanism that utilizes Newton's third law of motion to turn the vehicle about such axes. The first of these solutions has the defect of entailing a loss into space from the vehicle of the materials that make up propulsive jets. During a long period of spatial travel such loss might involve an inordinately large amount of materials to be initially transported into space. The second solution, of control by internal reaction, is the better way of solving this particular problem.

Another problem to be solved is that of providing attitude control with the expenditure of a minimum of power, supplied by a power means that involves a minimum of weight to be transported into space. Such power means may be a nuclear-energy device, a storage battery, or means utilizing energy such as that of solar heat which is transmitted through space, possibly comprising, for example, solar cells of silicon wafers or the like, for converting the sun's rays into electrical current. Such cells preferably would be associated with a standby battery for supplying current when solar radiation is prevented from striking them, as when they are in the shadow of the earth, of another planet or planetoid, or of a part of the variable-position satellite or other space vehicle. Although solar cells are bulky, their size presents no drag in space, and their weight is relatively low in comparison with the power that may be extracted from them during a space flight or orbit of long duration.

Another problem that is involved in this invention is provision for the dissipation of undesirable heat from a space vehicle through the surrounding vacuum. The absence of air, which would permit heat transfer from an electric motor by convection, makes desirable a motor that generates little heat and that utilizes only a small amount of power.

Still another problem is presented by the necessity of providing an attitude-control motor that will function efficiently on a passengerless satellite or other space vehicle, or on a passenger-carrying space craft in a location or under conditions that make its repair not feasible, during an orbit or space journey of long duration.

In view of these facts, a major object of this invention is to provide a space vehicle attitude control system comprising: A rotary mass on the vehicle that exerts a reaction tending to turn the vehicle about an axis, which absorbs undesired angular momentum of the vehicle about said axis and which thereby controls the attitude of the vehicle about the axis; a light-weight electromotive means for rotating said mass, said electromotive means being specifically adapted to generate a minimum of heat in its windings and commutator, and to expend a minimum amount of current; a low-weight source of power for supplying current to said means; and an attitude sensing and/or controlling means for control of the supply of said current.

Another object of this invention is to provide, in a missile-transported satellite or other space vehicle that is subject to extraordinarily high accelerations of short duration, that might tend to disturb its desired attitude, or that might accompany a sudden, sharp maneuver of the vehicle, an attitude-control system comprising the above-listed sub-combinations wherein the electromotive means has enough power to control the vehicle's ordinary deviations in space travel (but is not powerful enough to counteract said extraordinarily high accelerations) in combination with high-powered means for counteracting the extraordinarily high accelerations for a short period of time. A further object of the invention is to provide an attitude control system of one of the above-identified types, in combination with electric means, responsive to the speed of the attitude-correcting motor, for damping or overcoming hunting tendencies of the system.

The foregoing and other objects of the invention will become more fully apparent from the following detailed description of exemplary structure embodying the invention and from the accompanying drawings, in which.

Figure 3:
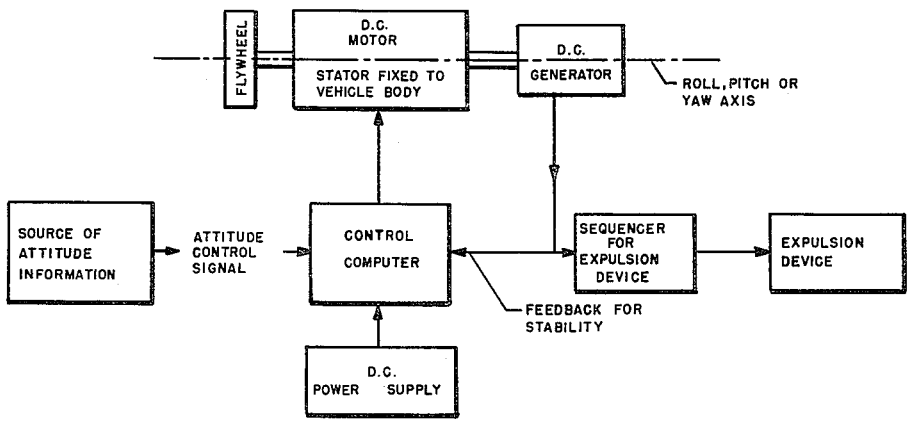
Figure 3 is a diagram of an embodiment of the attitude control system, shown as usable relative to the roll, pitch or yaw axis of a space vehicle, and as comprising a direct-current control motor that utilizes a mechanical, brush commutator.
Figure 5:
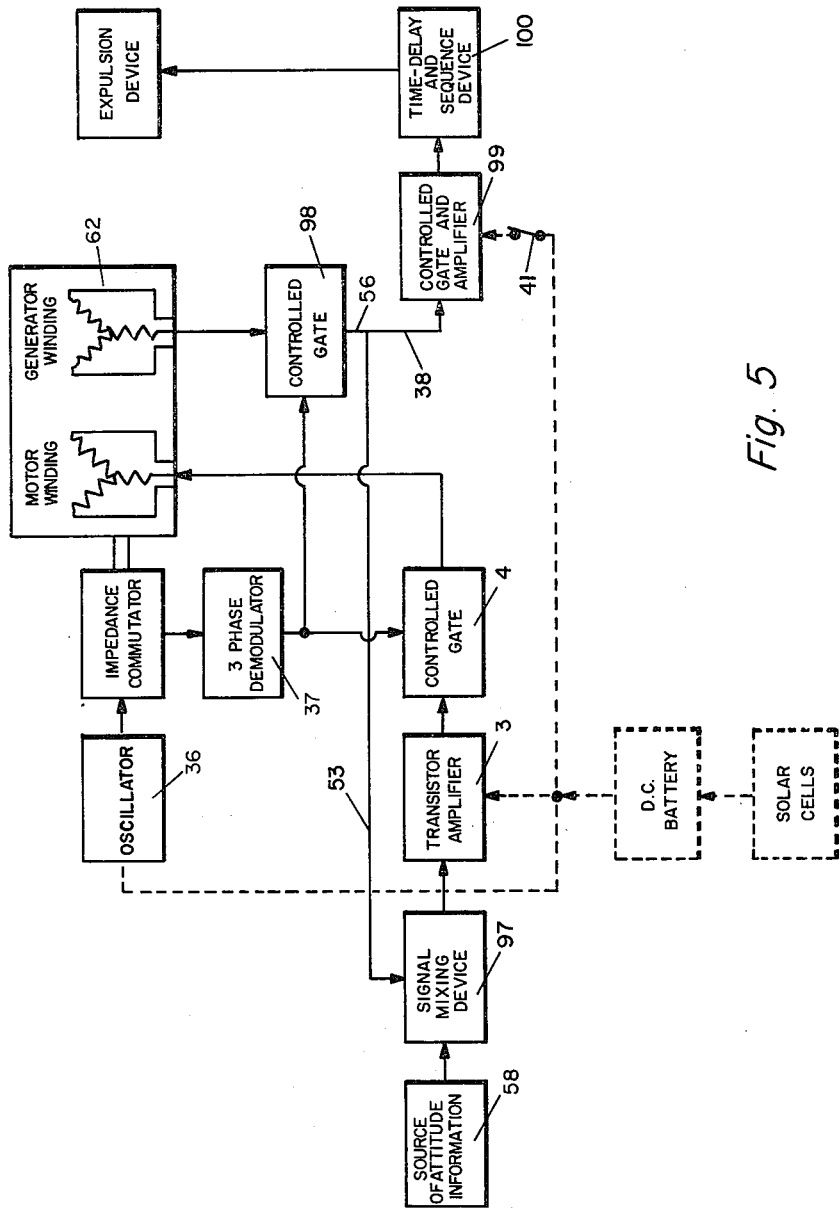
Figure 5 is a diagram of another embodiment of the invention, comprising a control motor that has a fixed armature winding, a frictionless, contactless impedance commutator, and a time delay and sequencer for the expulsion device.

As shown in the drawings, with specific reference to Figures 3 and 5, the attitude control system for each of the pitch, yaw and roll axes of the space vehicle broadly comprises: A flywheel; a motor for driving the flywheel at varying speeds, having a part that is so fixed to the body of the space vehicle as to cause a change in the attitude of the vehicle, due to the reaction on the vehicle from the torque that accelerates the rotary part of the motor; means for supplying power and transmitting it to the motor; means controlling said transmission of power (comprising any known type of computer as shown in Figure 3, or a controlled gate, transistor amplifier and/or a control signal mixing device as shown in Figure 5); a mechanism connected with the power control means for sensing deviations in the desired attitude of the vehicle relative to one of its pitch, yaw and roll axes and for supplying a signal to the computer; and an expulsion device for exerting a thrust on the vehicle for counteracting abnormally large attitude-deviating forces.

The attitude sensing and overall controlling mechanism designated in the diagrams may be any appropriate type of guidance means. It may be actuated in accordance with information concerning the direction of entities outside the space vehicle (such as the direction of the sun or the earth), or in accordance with the position of elements on the space vehicle (such as the position of a vehicle part relative to a space-fixed inertial-guidance platform, and/or the pilot-controlled position of a manual control means). Although inertial guidance systems have sufficient accuracy for ballistic missiles, limitations in the performance of presently known inertial instruments would reduce their accuracy during a long-duration orbit or space voyage to the point where their overriding control by means sensitive to outside entities (such as a radiating field, potential field or matter-containing field) would become mandatory.

Such over-riding control, involving a combination of two types of guidance systems, is of especial value when there are interruptions of the sensor's receipt of extraneous supervisory information, such as when the earth, moon or another planet shuts off the sun's rays, and also when the received supervisory signal is noisy and should be averaged, for better attitude information.

The most efficient specific attitude-sensing system or combination of systems—that is, the type of sensor, its over-riding control (if such be utilized), and the number of vehicle axes about which vehicle attitudes are controlled—may be selected only after analyses of the space vehicle's mission and its desired path, and after consideration of the consequent requirements of accuracy, weight, power and volume.

For some space vehicle missions, for instance, it may be possible to use a space-fixed attitude control system for controlling the space vehicle about its yaw and pitch axes, while a limited angular rate of roll about the third, roll axis is tolerated or even required. When such a predetermined angular rate of roll is required, an input signal to the roll-axis control system that is dependent on the vehicle's rotary speed may be provided as, for example, by a rate gyroscope or an accelerometer.

Some alternative types of attitude sensors are listed in the following table:

TABLE 1

*Alternative attitude sensors*

| Resulting type of coordinate direction | Medium to be sensed | From— | Attitude sensor |
| --- | --- | --- | --- |
| Space fixed direction | Visible light | Stellar bodies | Light direction sensitive cell. |
| Direction fixed to center of emitting body | Visible light, infrared light | Sun, planet, moon | Light and infrared direction sensitive cell. |
| Direction fixed to center of body shadowing cosmic rays | Cosmic rays | Planet, moon | Cosmic ray sensor. |
| Magnetic field vector direction | Geomagnetic field (application questionable due to el. currents in ionosphere). | Earth | Magnetic compass. |
| Direction fixed to gravitational field vector | Gravitational field | Orbited body | Satellite body or pendulum. |
| Direction fixed normal to orbit plane | (Angular velocity of satellite due to attitude control direction fixed to center of orbited body). | | Rate gyro. |
| Relative velocity direction | Gas | Atmosphere | Angle-of-attack indicator, accelerometer. |
| Determined by signal reference direction determined by space vehicle to earth transmitter or receiver line. | RF signals | Earth | RF receiver, either on earth or in space vehicle (distance for attitude sensing is limited by length of base line). |

In both Figure 3 and Figure 5 the power for the system is shown as a source of direct electric current. In Figure 5 solar cells are shown schematically as supplying direct current via a storage battery to the remainder of the system. This battery operates as a standby source of current when the sun's light is shut off from contact with the solar cells; in practice, the battery is placed in parallel with the cells. As broadly indicated in Figure 3, the solar cells and battery may be replaced by any other appropriate source of direct current. Such other source may be, for example, a well-charged storage battery or a nuclear-energy power unit.

In practice, the direct current emanating from solar cells and/or the battery would be of low amperage. Also the current from a nuclear power unit preferably would be of low strength, because of the large weight of known nuclear units of large power. To satisfactorily utilize this available direct current of low power, this invention comprises a flywheel and motor assembly that is capable of operating on the available low electric power for controlling the attitude of the vehicle while it is in orbit, or in sustained straight-line movement in space travel, and it further comprises (for any attitude correction or swift maneuvering of the vehicle that requires a high-powered corrective or maneuvering reaction) a means for the expulsion of matter from the vehicle. Such means, broadly indicated in Figures 3 and 5, may be any type of reaction motor, such as, for example, a rocket motor, utilizing solid or liquid propellant, or a reaction motor that utilizes a nozzle that ejects a compressed air jet, or one that fires small masses of bullet-like pellets.

For efficient attitude-correction or steering control of the vehicle, any reaction motor that is utilized preferably would have an anti-hunting means, for preventing hunting or see-sawing of the vehicle due to excessive operation of the expulsion device. An example of such an anti-hunting means is broadly indicated in Figures 3 and 5 as a time-delay and sequence device. The device may be any known electrical system relay, circuit making and breaking device or camming mechanism which, in relation to time, selects the number of control pulses that are to be successively and rapidly applied to the expulsion device, and further selects the interval of time between the sets of grouped pulses (and consequent magnitudes of thrust from the expulsion device).

Figure 16:
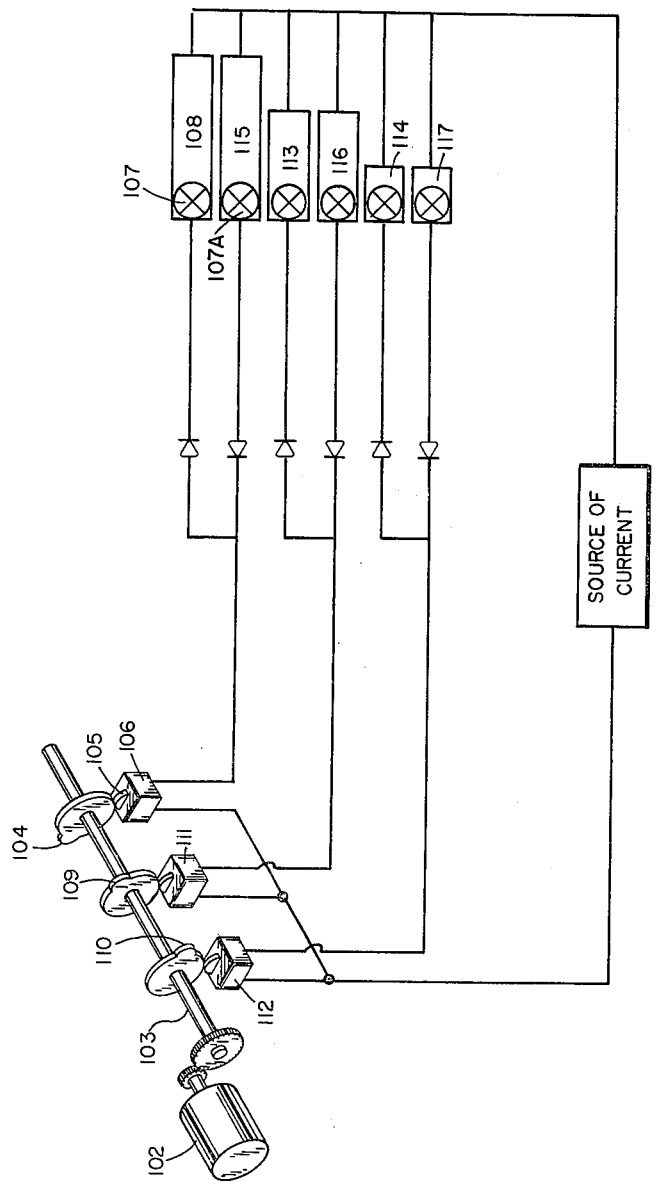
Figure 16 is a semi-schematic view of electrical control means and expulsion devices for counteracting extraordinarily high accelerations relative to either direction about each of the three axes of the vehicles.

A specific example of such a sequence device is a camming mechanism which comprises a cam shaft that is rotated by clockwork, and cams mounted on the shaft, said cams successively closing switches for predetermined periods of time. Each successively functioning cam completes a circuit that would operate the expulsion device providing an impulse that is smaller than the preceding impulse, caused by the preceding cam, until there occurred a final single-unit burst from the expulsion device. Another and preferred example, functioning in either direction about each of the vehicle's three axes, is shown in Figure 16. These examples will be described in detail later in this specification.

Figure 4:
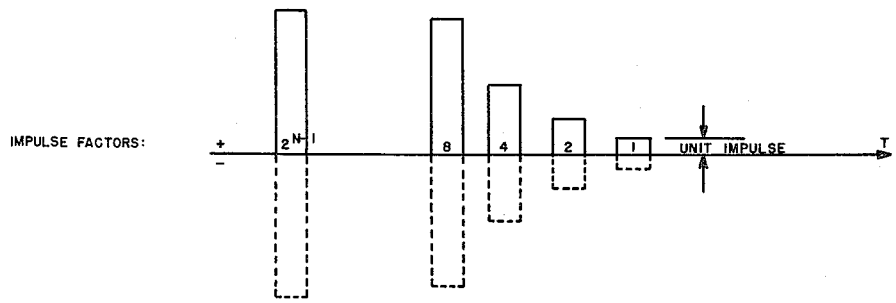
Figure 4 is a diagram indicating the magnitudes and the sequence of the impulses that are provided by the expulsion device, for correction of the vehicle's attitude after an abnormally large attitude-disturbing impulse has been exerted on the vehicle.

In Figure 4 the magnitudes (or impulse or thrust factors) of the expulsion device and the sequence and grouping of the pulses supplied by the sequence device are diagrammatically illustrated, with the timed delay between sets of pulses shown relative to the central line T. The two possible directions of the attitude-changing thrusts are indicated as extending above and below the base line T. The basic magnitude of the diagram is shown at the right as one impulse. This is equal to the maximum angular attitude-disturbing impulse which can be corrected by reaction on the vehicle from the turning of one or more of the attitude-correcting flywheels at the flywheel's average speed. Any attitude-disturbing impulse which is of greater magnitude than this unit impulse is corrected by a unit or sets of grouped pulses (and the consequent unit or sets of unit magnitudes of corrective thrust from the expulsion device). When the speed of the attitude-correction motor is increased above its average, due to a vehicle-disturbing thrust that is greater than the unit impulse, the extraordinary speed, which measures the abnormal thrust and leads to a strong voltage from the generator (Figures 3 and 5), controls the sequence device.

In accordance with this voltage, the sequence device determines the number of pulses (and sets of pulses if more than one unit impulse is necessary to reduce the attitude deviation to a normal figure), and transmits the pulses to the expulsion device which produces a corresponding number of corrective impulses.

An example of the various flywheel system design reduction factors possible in the control system is indicated at the top of Figure 4, wherein N is the total number of pulses automatically selected by the sequence device.

The direct-current, low-powered source of energy that supplies power to the normally functioning part of the attitude-control system not only makes desirable the means for expulsively producing large control thrusts as described above, but also makes desirable, in the provision of normal attitude control, a flywheel-rotating electric motor that produces a maximum of power per unit of electrical energy. Such a motor also should be of low weight, to reduce its take-off loads and should produce a minimum of heat, to reduce loss of power, and to reduce the amount of heat that must be dissipated from the motor and/or space vehicle.

In most installations, this motor will be functioning in the vacuum or near vacuum of space. Such vacuum will make quite difficult the problem of dissipation of any heat that is generated in the motor winding and commutator. This is due to the lack of air for convection. The vacuum also entails the problem of providing a motor of low friction and wear, and consequent long life with little or no need of repair within the vacuum by air-breathing operators. This latter problem is intensified on a passengerless vehicle, such as a manless satellite or ballistic missile in the upper part of the trajectory.

In a solution of these problems, this invention preferably comprises a specific type of control motor assembly, several forms of which are shown in Figures 6 to 15.

In this assembly, permanent field magnets are used, to eliminate the heat that would be generated in a field coil, and in the mechanical commutator that would be required if the motor were a standard D.C. motor. Although a mechanical commutator would not be required in an alternating-current induction motor, such a motor would not be efficient on a space vehicle because of the heat and power losses in the armature winding, which result from the electrical excitation of the necessary magnetic field. On the other hand, no alternating-current motor of variable speed that utilizes a permanent magnet field is available. In view of these facts, the control motor that is part of this invention utilizes, with rotary permanent field magnets, a stationary armature that receives current that is controlled by a frictionless, impedance commutator.

Figure 6:
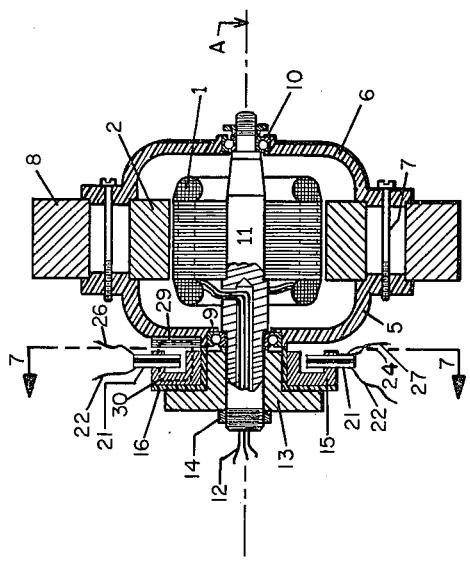
Figure 6 is a sectional view of a rotatable, attitude-controlling flywheel and of its control motor (and/or anti-hunting generator), taken along the line 6—6 of Figure 7.
Figure 14:
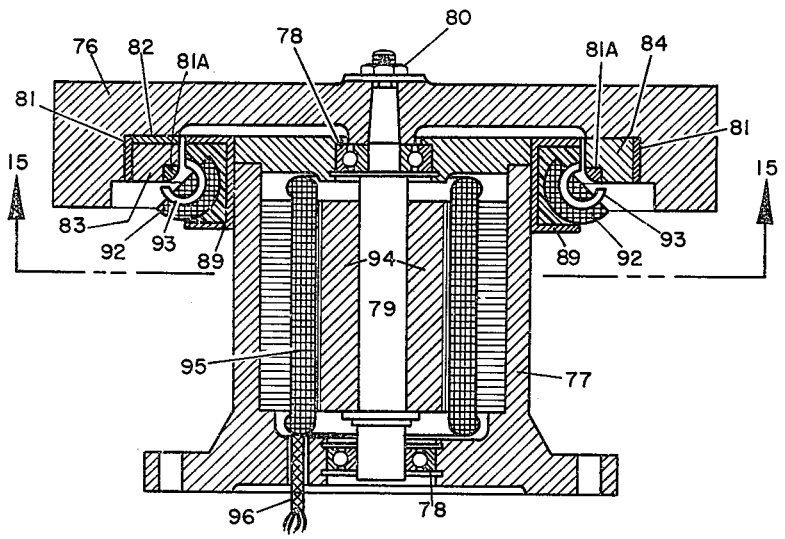
Figure 14 is a sectional view, from the plane 14—14 of Figure 15, through the axis of another embodiment of the assembly of the flywheel and motor.

A form of the flywheel and motor assembly is shown in Figure 6 as comprising an inner stationary armature winding 1, which may comprise any appropriate number of coils, and outer rotary permanent field magnets 2, that envelop the armature; whereas in the assembly shown in Figure 14 the armature winding 95, which may comprise three or four or more coils (with an equal number of output impedance coils), is shown as encircling the permanent magnets 94.

In Figure 6, the permanent magnets 2 are shown as clamped between two flywheel central parts 5 and 6 of non-magnetic material, such as aluminum or reinforced plastic, said parts being fastened together by means of bolts 7 or the like. The heavy, outer portion 8 of the flywheel is also clamped between parts 5 and 6.

Within the apertures of the central flywheel parts bearings 9 and 10 are supported, thereby journaling the flywheel, radially and in thrust, on axle 11. The axis A of this axle may coincide with the particular one of the vehicle's pitch roll and yaw axes that is to be controlled by this particular flywheel and motor assembly; or, alternatively, axle axis A may be parallel with and spaced from one of these primary axes of the vehicle. Conductors 12 are connected to gate 4 (Figure 5); they supply commutated current to winding 1.

Figure 7:
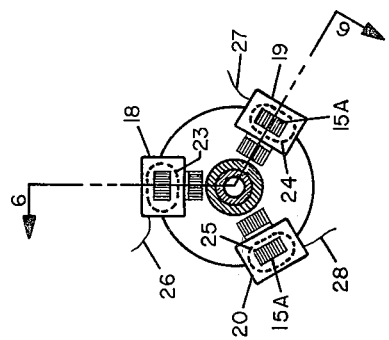
Figure 7 is a sectional view taken along the line 7—7 of Figure 6.

Flanged bushing 13, which is fixed on axle 11 between the inner race of bearing 9 and nut 14, supports magnetic core 15, which may be of sintered iron or, as shown in Figure 7, laminated steel. Non-magnetic layer 16 of plastic or other insulating material is interposed between elements 13 and 15. Projecting core elements 15A are encased by a plurality of pairs of inductive coils, each pair consisting of axially-aligned coils, said pairs being equal in number to the phases of the motor; in the case of Figures 6 and 7, three pairs of such coils, 18, 19 and 20, are shown, each pair comprising a coil 21 that receives alternating-current voltage from a conductor, e.g., 22, that is connected to oscillator 36 (Figure 5) and a coil (23, 24 or 25) which, under certain circumstances, transmits an induced voltage via one of the conductors 26, 27 and 28. In lieu of the three pairs of coils, 18, 19 and 20, three single coils may be utilized.

Flywheel element 5 has embedded in its non-magnetic part a single core element 29. When the flywheel is rotated and element 29 comes opposite a pair of coils (18, 19 or 20) on core 15, a path 30 of magnetic flux is completed, and a pulse of voltage is formed in coil 23, 24 or 25 and transmitted to conductors 26, 27 or 28.

The frequency of the pulses through one of the conductors (26, 27 or 28) is proportioned to the speed of the motor. The frequency of the voltage coming from each of the conductors 26, 27 and 28 thus is a measure of the speed of the flywheel. Moreover, the successive pulses through conductors 26, 27 and 28 constitute a commutation of the current received from conductor 22, dividing the current in accordance with the varying relative positioning of rotary field magnets 2 relative to the stationary coils of winding 1.

Figure 8:
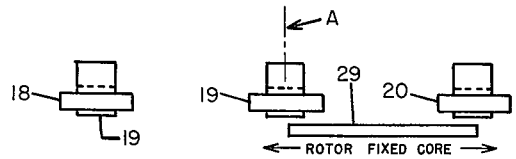
Figure 8 is a schematic view indicating the magnetic core of the flywheel and the three coils of the inductance type of frictionless, impedance commutator shown in Figure 6, developed along its circumference and the circle of the centers of the coils.
Figure 10:
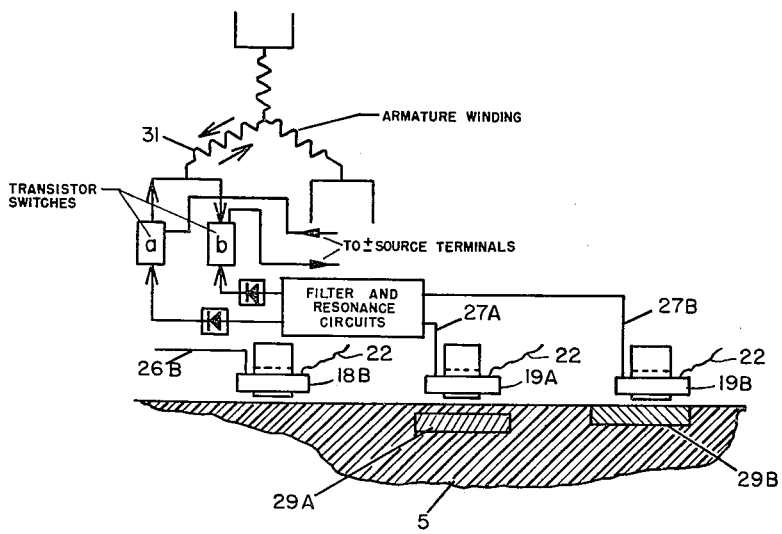
Figure 10 is a schematic view indicating another embodiment of the inductance type of contactless commutator.
Figure 11:
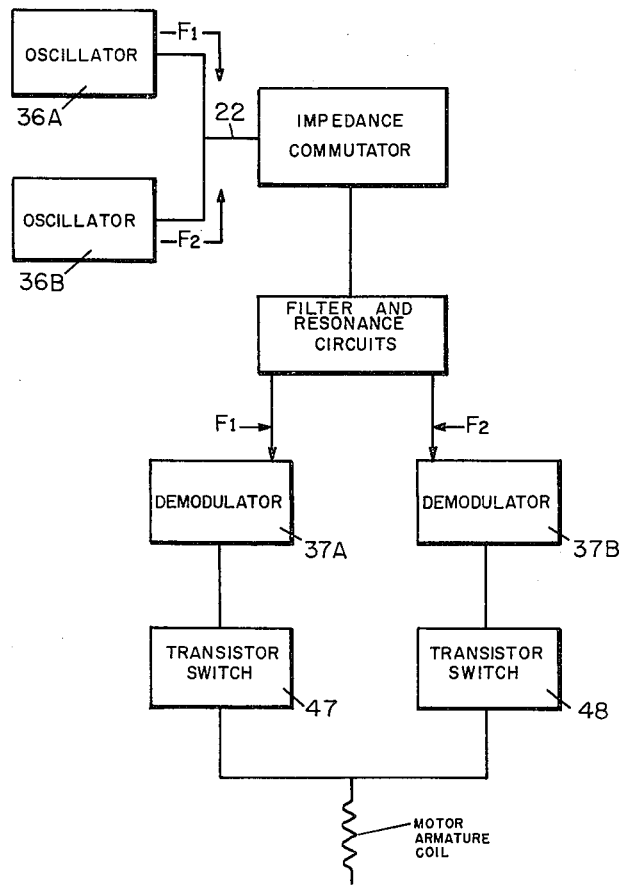
Figure 11 is a diagram indicating the manner in which a pair of transistor switches (one of the three pairs of transistor switches that function with the three motor coils shown in Figure 10) operates to send alternating pulses of current through one of the motor coils.
Figure 12:
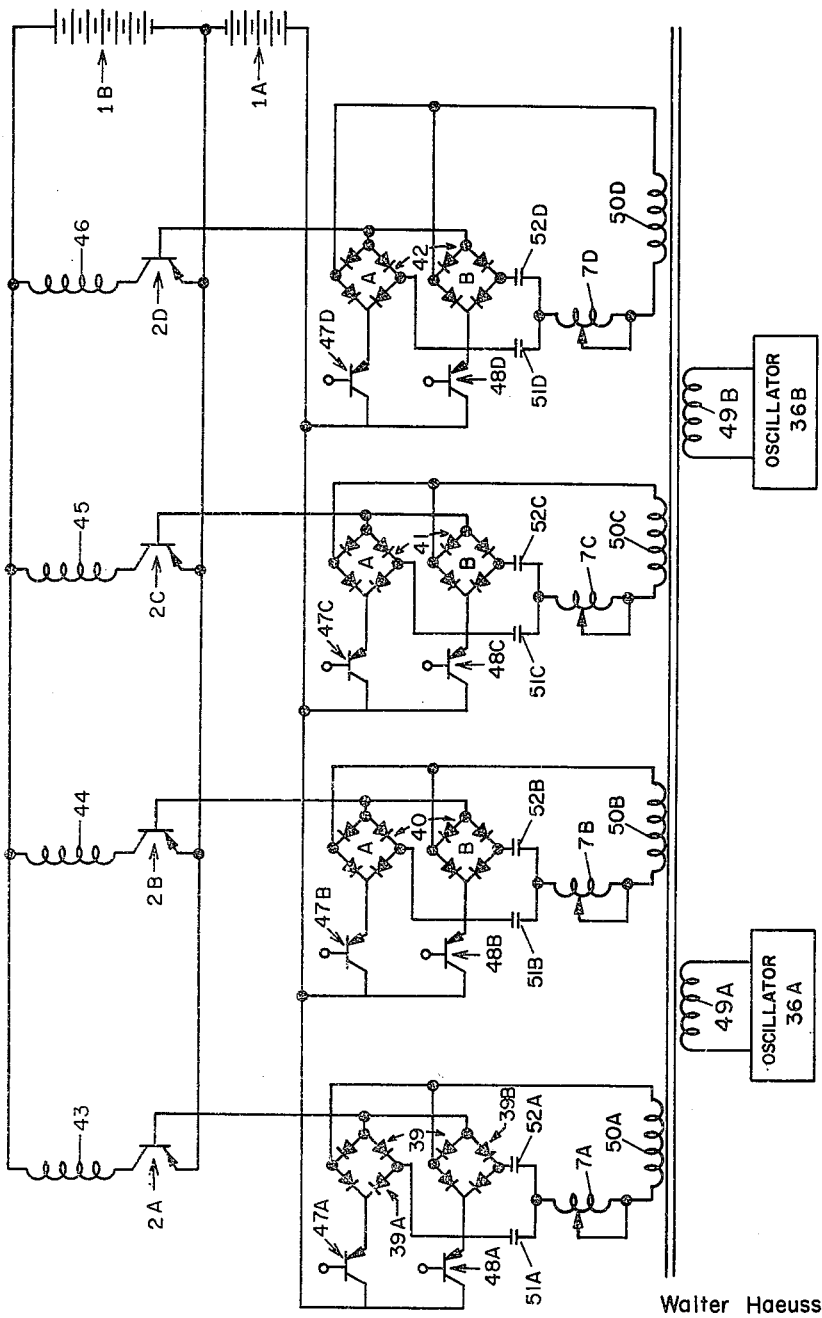
Figure 12 is a schematic diagram of an embodiment of the control motor circuits that is alternative relative to that of Figure 5, wherein the control motor has four coils, and the impedance commutator, the demodulator and the controlled gate are modified for appropriate four-phase commutation of the motor-actuating current.

The above-described frictionless, impedance commutator may be referred to as an inductance commutator. A second embodiment of such an inductance commutator is schematically shown in Figure 10. This embodiment comprises an alternative type of core 29. Instead of being in one piece, as shown in Figure 8, the core 29 has been divided into two separate core elements 29A and 29B, with element 29A being at a further distance from the annulus of the coils 18, 19 and 20 than element 29B. This variation in the air gap between the parts of core 29 provides for plus or minus direction of the current in the armature winding by means of separating filter and resonance circuits and demodulators (shown in schematic detail in Figure 11). Transistor switches $a$ and $b$ are controlled by the demodulators, thus sending current in the direction through one of the motor winding coils (31) that is determined by the particular air gaps that exist for the moment between the impedance commutator elements 18, 19 and 20 and core elements 29A and 29B. In the type of the motor shown in Figures 10 and 11, each of the impedance-commutator coils 18, 19 and 20 of Figure 7 has been replaced, or divided into, a pair of coils, which receive current from a pair of oscillators 36A and 36B (Figure 11). Only one of these pairs (19A and 19B) is shown in Figure 10; but one (18B) of the pair of coils that replaces the single coil 18 of Figure 7 also has been shown, as supplying current to line 26B. This line, which is indicated as broken away, is connected to a second one of the motor windings (shown but not numbered in Figure 10), and to this winding there is also connected the second coil (not shown) of pair 18. To the third motor winding another pair of coils (similar to coils 19A and 19B) and circuitry (similar to that shown in Figure 10) are connected; these are not shown in this schematic view.

Figure 9:
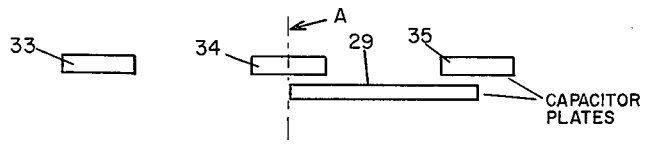
Figure 9 is a schematic, developed view, similar to Figure 8, but indicating a capacitive reactance type of frictionless, impedance commutator.

Another type of frictionless, contactless impedance commutator may be referred to as a capacitive commutator. This type having a variable capacitance comprising plates 33, 34 and 35, in lieu of the above-described variable inductance of Figures 6 to 8, is illustrated in Figure 9.

An impedance commutator (alternatively of the inductance or capacitive type) is shown in Figure 5 as receiving alternating current from an oscillator 36. In the attitude control system shown in Figure 5 such an oscillator is desirable for conversion of the direct current that is utilized into the alternating current that is necessary to excite the variable impedance in the disclosed contactless commutator. However, if the source of current should be an alternating current generator, oscillator 36 would be eliminated.

Any of the known types of oscillators may be utilized as element 36. This element supplies alternating current to the various conductors 22 that are connected to the coils 21 of the impedance commutator.

The structural details of other elements broadly indicated in the block diagram of Figure 5 are well known in the missile guidance-and-control and electronics arts. Amplifier 3 may be, for example, one of the types described in section 2 of Electronic Designers' Handbook, by R. W. Landee, et al. or, if a vacuum-tube amplifier be desired, of the type shown in Patent 2,115,086. The controlled gates 4, 98 and 99 preferably comprise transistorized switches of the type schematically indicated in Figures 10, 11 and 12 or illustrated in section 2 of said Handbook. The feedback or signal mixing device 97 may be similar to device 27—29 of Patent No. 2,115,086 or may be of the type of feedback arrangement that is described in section 18 of said Handbook.

The alternating-current voltage that comes in successive pulses through conductors 26, 27 and 28 is transmitted to demodulator 37, which rectifies the current, converting it into direct-current pulses. Any rectifier that is appropriate for functioning with the phase of the voltage coming from the commutator and the current utilized in the attitude control motor may be used in the invention. The four-phase demodulator assembly indicated in Figure 12 comprises four sets of four diodes, 39(A and B), 40(A and B), 41(A and B) and 42(A and B), for functioning in connection with the windings 43, 44, 45 and 46 of a four-phase control motor. The specific structure of this motor may be of the type shown in Figure 13 or in Figures 14 and 15, to be described later in this specification. Its purpose in this invention is to drive the attitude-controlling, reaction flywheel (8, 54 or 76) with a minimum of friction, heat dissipation in space and maintenance.

These four windings are displaced 90°. Power from electrical source 1A is applied to each of the windings through the power transistors 2A, 2B, 2C and 2D. The power transistors are controlled by the position of the rotor.

Figure 15:
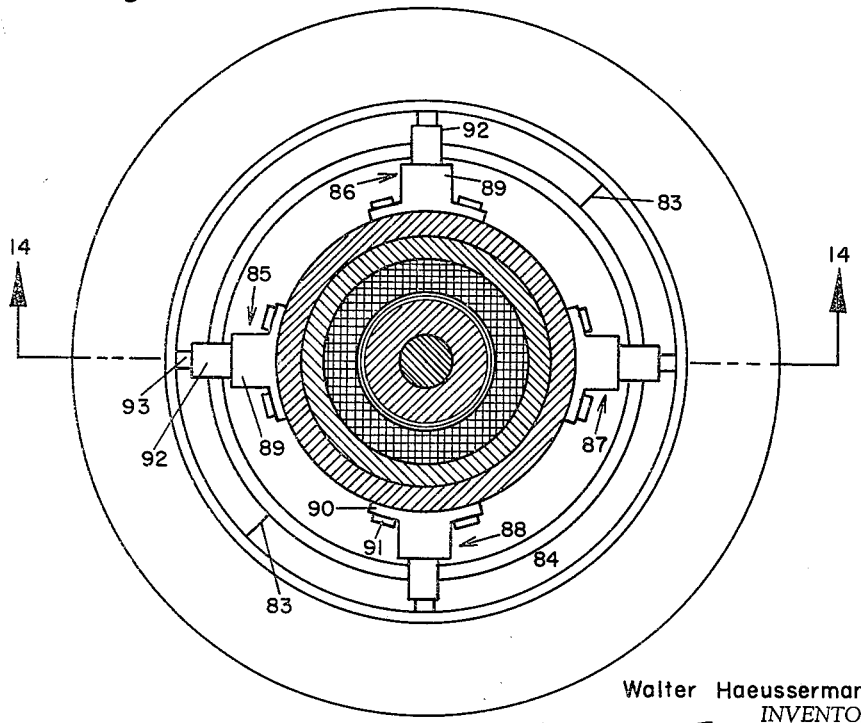
Figure 15 is a sectional view, taken from the plane 15—15 of Figure 14.

This rotor is of the type shown in Figures 6 and 7, except that it has four windings 43, 44, 45 and 46, and may be of the type illustrated in Figures 14 and 15. As shown in Figure 6, this rotor has a side disk of non-magnetic material, in which a core 29 of ferromagnetic material is embedded. This disk runs through the gap of the cores of chokes 7A, 7B, 7C and 7D. The inductance varies according to whether or not the ferromagnetic section 29 of the disk is in the gap, being higher when the gap is filled with the ferromagnetic section, and smaller during the period in which the non-ferromagnetic section passes through the gap.

In place of controlled gate 4 of Figure 5 (and as broadly indicated by blocks 47 and 48 of the diagram of Figure 11), two sets of transistor switches for each motor winding, 47A–D and 48A–D, which may be controlled, for example, by a control computer, determine the direction of rotation. Forward speed requires closed transistors in group 47A–D and open transistors in group 48A–D, whereas reverse speed requires open transistors in group 47A–D and closed transistors in group 48A–D.

The oscillators 36A and 36B apply their two frequencies $f_1$ and $f_2$ through transformer windings 49A and 49B to each of the secondary windings 50A–D. The capacitor group 51A–D is tuned to the frequency $f_1$ of oscillator 36A; whereas capacitor group 52A–D is tuned to the frequency $f_2$ of oscillator 36B.

Considering one winding only, for example 43, one revolution of the motor, divided into two periods, involves the following conditions:

*Period 1.*—With the ferromagnetic section in the choke gap, the inductance and capacitor 51A are tuned to $f_1$ and detuned to $f_2$. The resonant current from $f_1$ is rectified in rectifier 39A, flows through the closed transistor 47A and the bias battery 1A, thus closing transistor switch 2A. The current of the frequency $f_2$ is small relative to the resonant curve.

*Period 2.*—With the non-ferromagnetic section in the choke gap, the inductance and capacitor are detuned to $f_1$ and $f_2$. The current is small relative to the resonant curve. The transistor switch 2A is therefore open.

In both periods no current can flow through capacitor 52A and rectifier 39B because of the open transistor 48A. This sequence involves forward torque.

In reverse torque, transistor group 47A–D is open and group 48A–D is closed. Therefore, no current can flow through capacitor 51A and rectifier 39A.

During Period 1 the inductance and capacitor 52A are detuned to $f_1$ and $f_2$. During Period 2 the current is small again; during this period the inductance and capacitor 52A are tuned to $f_2$. The resonant current flows through rectifier 39B, closed transistor 48A and the bias battery 1A, thus closing the transistor switch 2A. Capacitor 52C and the inductance are detuned to the frequency $f_1$, with a current that does not appreciably influence the system. The resulting torque is in the reverse direction.

Since the four chokes, 7A–D, are mounted with a displacement of 90° the described operation of the four electronic devices is shifted in phase 90°. Therefore, the currents applied to the windings 43, 44, 45 and 46, in sequence, generate a rotating field that corresponds to the rotation of the permanent magnet.

At the same time that controlled gate 4 (Figure 5) is receiving direct-current pulses and functioning to control the application of alternating current to the motor windings, controlled gate 98 also is receiving pulses from demodulator 37. This second controlled gate may be of the same type as controlled gate 4 (Figure 5), and when used in a four-phase circuit may be similar to the transistorized gate assembly shown in Figure 12. This gate receives alternating-current voltage from generator winding 62 (Figure 5), rectifies this voltage and transmits it to circuit 56, which supplies gate-controlled current for any desired useful purpose.

Figure 13:
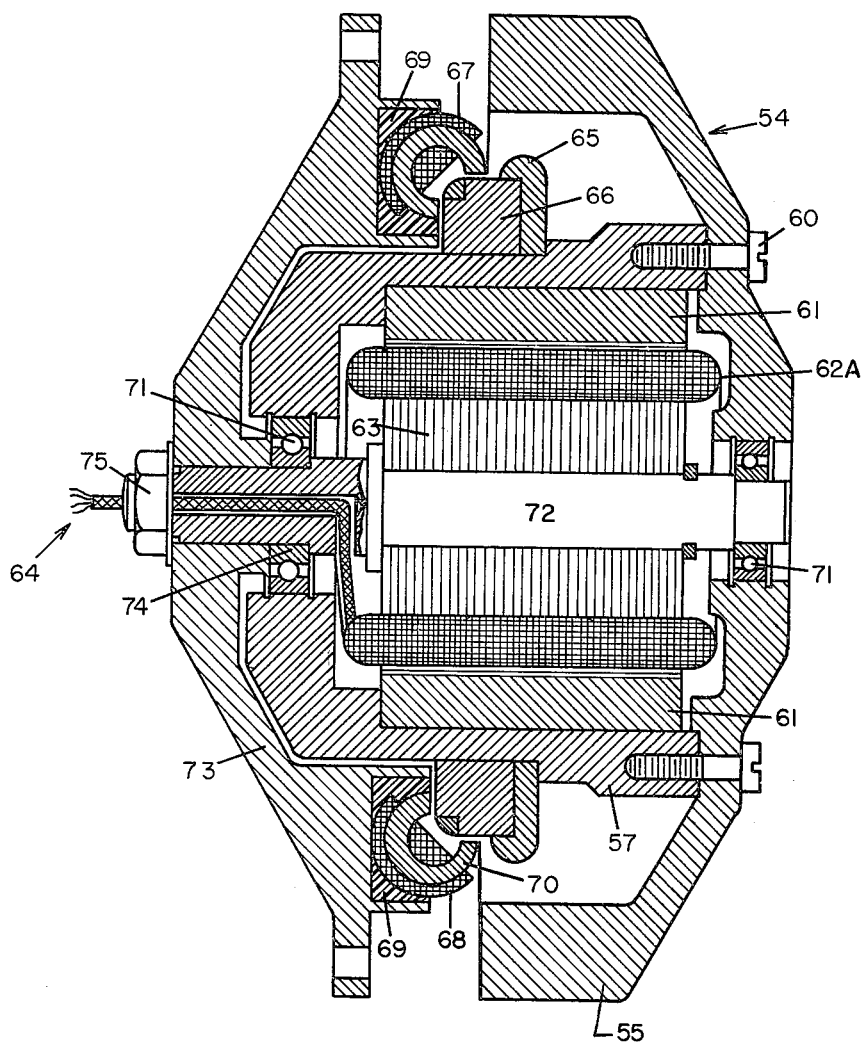
Figure 13 is a sectional view through the axis of one embodiment of the assembly of the flywheel, motor stator and rotor, and impedance commutator.

Figures 13, 14 and 15 illustrate two other forms of the motor of the invention. In Figure 13, the motor is shown as driving flywheel 54, which may be of aluminum or other non-magnetic material, but is shown in this figure as of steel, with parts of aluminum or other non-magnetic material between it and the impedance commutator and motor magnets. The flywheel has a heavy ring 55, which obviously could be made separately from and of heavier material than the remainder of the flywheel.

Non-magnetic housing 57, fastened to flywheel 54 by bolts 60, supports the permanent magnets 61 of the electric motor. Within the rotor of these magnets, the fixed armature 62A is located. The armature windings are located within slots in laminated-iron core 63 and receive commutated current from conductors 64 and controlled gate 4 (Figure 5).

Embedded within the aluminum or other non-magnetic material of core-holding ring 65 of the rotary assembly, there is a magnetic core element 66 which functions similarly to previously described element 29, to induce voltages in the four impedance commutator coils of this four-phase motor. In the sectional view of Figure 13 two such coils, 67 and 68, are shown; the other two may be considered as being on opposite sides of the plane of the section. The coils are embedded in plastic 69, and have magnetic cores 70. As shown in Figure 13, core piece 66 is in momentary position to induce a voltage in coil 67.

Bearings 71, of quartz, diamond or the like are supported on non-rotating shaft 72, which is fixed to motor support 73 by means of a shaft shoulder that is held against inner race 74 by nut 75.

In Figures 14, and 15, steel flywheel 76 is shown as being supported relative to motor housing 77 by means of bearings 78, in which bearings rotary shaft 79, that is fixed to flywheel 76 by nut 80, is journaled. Within the flywheel ring 81 and parti-annular, apertured disk 82, both of aluminum or other non-magnetic material, there is housed parti-annular core piece 83, which in this form extends through a little less than 180°, around the driven rotary element. The remainder of the 360° of the ring is filled with a parti-annular ring 84 of aluminum or other non-magnetic material. Core piece 83 is L-shaped in cross section and is supported on its inner side by holding ring 81A, which is of aluminum or other non-magnetic material.

As the core piece rotates, it coacts to form magnetic circuits with four impedance coil asemblies 85, 86, 87 and 88 (Figure 15). Each of these assemblies comprises: an oblong housing 89 of aluminum or other non-magnetic material, fastened to motor casing 77 by means of side flanges 90 and bolts 91; impedance coil 92; and parti-annular magnetic core 93, that is circular in cross section.

In the form of the invention shown in Figures 14 and 15, shaft 79 of the rotary element is fixed to and driven by permanent magnets 94, which coact with armature windings 95, when the windings receive commutated current from conductors 96. Alternatively, when the machine is used as a generator, current is supplied from conductors 96 and through the impedance commutator to a useful circuit.

Generator winding 62 (Figure 5) preferably is wound in the same slots as those occupied by the winding of the control motor. The alternating-current voltage that is induced in winding 62 constitutes a measure of the velocity (and the acceleration or deceleration) of the motor and flywheel, and therefore may be utilized for two purposes. One of these is to provide, through line 53, a velocity feedback signal that is used for damping or the prevention of hunting in the control system; the other is to provide, through line 38, a signal of excessive flywheel speed (caused by an extreme deviation of the space vehicle), which signal triggers the sequence device and then the expulsion device. The velocity feedback signal is transmitted, through 53, to a known type of signal mixing device 97.

The faster the attitude-controlling motor-and-flywheel asesmbly turns, the greater is the signal voltage in line 53, and the greater the opposition in the signal mixing device to the attitude signal that is coming from the source of attitude information 58. In some instances the differential between the two signals is such as to cause a reversal of the direction of rotation of the flywheel. In other instances the feedback voltage increasingly counteracts the signal voltage but the sum of the signal and feedback voltages remains positive and merely reduces the torque of the motor before full correction of the vehicle's attitude is obtained. In either event, hunting is substantially reduced.

In lieu of the anti-hunting feedback shown, a feedback that is the first mathematical derivative of the input attitude signal may be uilized. This may be achieved by use of an electrical resistance capacitance network of a known type.

As soon as it is necessary to have the sequence and expulsion devices in preparation for operation, switch 41 is closed, for example, by energization of a solenoid, and it supplies power to the sequence device. If controlled gate 98 includes an amplifier, power also is supplied from the switch, as shown in Figure 5, to the amplifier.

When a signal is received from gate 98, gate 99 supplies current to the sequence device 100, which, as shown in Figures 5 and 16, fires or otherwise expels material from the vehicle.

After switch 41 is closed, direct-current pulses are conducted to the time delay and sequencer device 100, which selects the number of pulses, provides for the interval between pulses and supplies the properly delayed pulses to the expulsion device, in a manner to reduce hunting of the vehicle due to the attitude-correcting expulsion of material. When the last pulse of the series occurs, gate 99 opens switch 41.

In the preferred form of sequence-and-expulsion unit that is shown in Figure 16 attitude control for large disturbances or sharp maneuvering turns in either direction about each of the three vehicle axes is achieved. In the operation of this assembly, constant-speed electric motor 102 receives voltage from the direct-current battery through a switch or relay operated electrically or electronically, as by a transistor, when the need for attitude control arises. This timing motor rotates cam shaft 103 thru a reduction gear.

Figure 1:
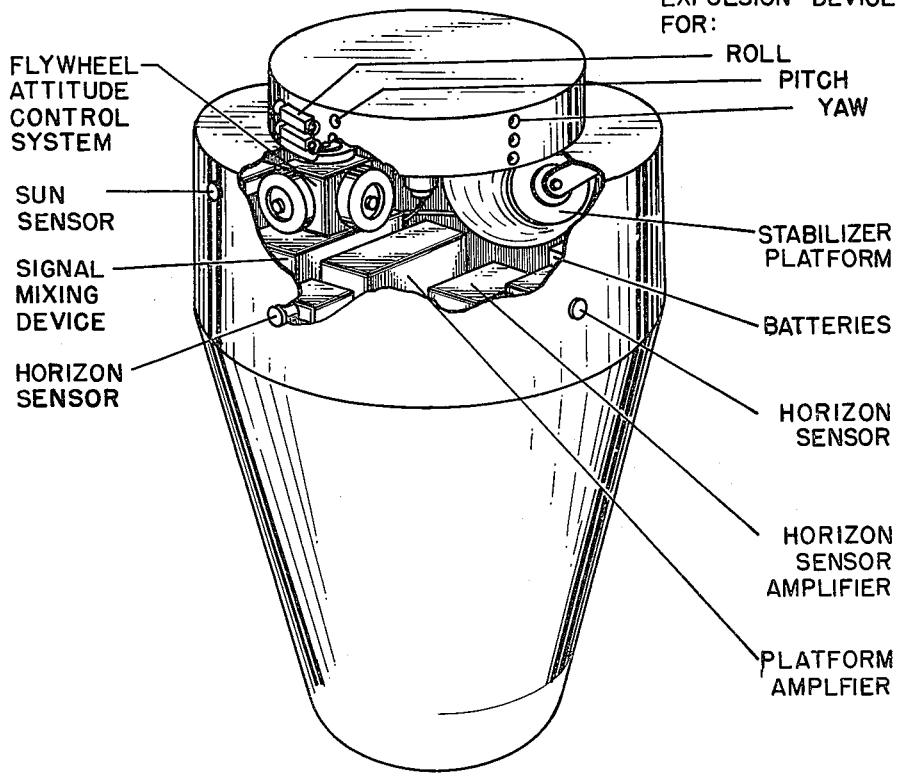
Figure 1 is a schematic view of a satellite embodying the attitude control system of this invention.
Figure 2:
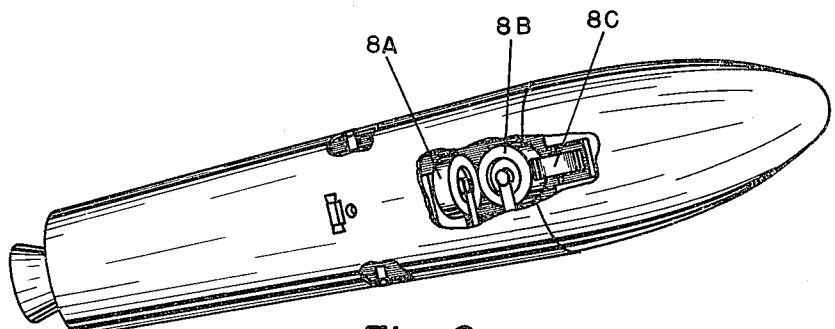
Figure 2 is a schematic view of a ballistic missile or space craft embodying the invention.

The unit may be designed for rotation of shaft 103 in either direction. In Figure 16, however, this shaft turns in a counterclockwise direction, and is shown with all its cams out of contact with the switches. Shortly after the positioning of the cams shown in Figure 16, cam 104 depresses cam follower 105, against its spring in switch box 106, and thus supplies current to one of the pair of igniters 107 and 107A, depending on the nature of the signal coming from line 56 (Figure 5, schematically indicated in Figure 16 as the source of current). If the signal is positive, requiring correction of the vehicle's attitude and/or attitude-disturbing momentum about the particular axis that is involved, depression of cam follower 105 supplies current to igniter 107. Thus large expulsion device 108, which may comprise explosive material, or powder and a bullet-like mass, is fired, to correct the vehicle's attitude in the desired direction. (The three pairs of expulsion devices, for each axis, are shown schematically in Figure 16, but in practice, as indicated in Figure 2, the charges of each pair are pointed in opposite directions for control about one of the axes in either direction.)

After the firing of expulsion device 108, if the correction signal from line 64 remains positive, cams 109 and 110 successively fire or otherwise operate medium-sized expulsion device 113 and small device 114.

In this connection, it is pointed out that in practice the reduction gear shown in Figure 16 is designed to provide a predetermined delay, determined by computation in the layout of the system, between the actuation of the cam followers of the three microswitches. If, during the delay between the actions of cams 104 and 109, the correction signal from line 56 changes from positive to negative, the rectifiers shown prevent the firing of the positive charge 113 and, instead, fire the negative charge 116. Thereafter, in the delay between the switch-operating actions of cams 109 and 110, the signal may (or may not) again change its sign, with corresponding change in the direction of firing of the expulsion charges.

For each of the vehicle's three major axes an attitude-correcting system of the type shown in Figure 16 is provided. When the resulting three-axis system is incorporated, for example, in a missile or satellite, it functions to correct for relatively large perturbations, such as occur during separation of the last missile stage from the foregoing stage, in any direction and about any axis. By means of the expulsion charges, the system thus causes a reduction of the perturbation level to such an extent that the light-weight, light-powered flywheel system is able to compensate for remaining disturbing momentums.

The expulsion system eliminates the major part of the vehicle's undesired momentum about the three axes. The flywheel system absorbs the remaining and later-occurring perturbations by acquiring rotary speed. By proper design of the flywheel's dimensions of thickness and radii—the eddy currents which are created in the rotating flywheels due to magnetic fields, such as those that surround the earth, gradually brake the flywheels' speeds. Such braking action occurs in either direction of rotation of a flywheel. This feature allows a reduction in speed of the flywheels, without disturbing the vehicle's attitude, thus making the flywheels more readily available for efficient absorption of further undesired perturbation during continued travel of the vehicle.

This feature also reduces friction and magnetic losses in the motor and thus lessens the power necessary to maintain the flywheels' speeds and correcting momentums.

Within the scope of the subjoined claims, the invention comprehends various obvious changes in the specific structure herein illustrated. For instance, any number of pairs of expulsion charges may be provided in lieu of the three pairs shown in Figure 16. Also, in some embodiments based on selected, mathematically calculated system data, such as properly selected armature windings and magnetic flux, no flywheel velocity feedback would be necessary for a fairly stable, anti-hunting system.

One example of the calculations on which such a control system, wherein anti-hunting stability is due to the induced electromotive force of the motor, is set forth below. These derivations are based on the assumption of an idealized system, whose components have no time lag, friction, saturation or similar variables. In practice, the calculations usually would be corrected for known specific variables of this type. In these specific derivations, moreover, coupling terms of the three orthogonal control axes are considered to be negligible.

The basic equation pertaining to torques about the axis to be controlled is:

$$I_1 \ddot{\phi} + I_2 \ddot{\alpha} = 0$$

wherein:

$I_1$ = moment of inertia to be controlled; $I_2$ = moment of inertia of the motor-and-flywheel assembly; $\phi$ = angular displacement of controlled axis of the space vehicle (the input signal, measured in a space-direction-fixed system); $\alpha$ = angular displacement of the motor-and-flywheel assembly about its axis of rotation; and the dots above the variables denote time derivatives. The equation for the equilibrium of voltages in the armature circuit of the direct-current control motor is:

$$f(\phi, \alpha) + e(\dot{\phi} - \dot{\alpha}) + kI_1\ddot{\phi} = 0$$

wherein:

$f(\phi, \alpha)$, control voltage applied to the flywheel motor = $a_0\phi + a_1(\dot{\phi} - \dot{\alpha})$ according to Figure 4; $e(\dot{\phi} - \dot{\alpha})$ = electromotive force of the flywheel motor; and $kI_1\ddot{\phi}$ = ohmic voltage drop in the armature circuit, due to control current that is proportional to its corresponding torque $I_1\ddot{\phi}$.

The characteristic equation of the system is:

$$s^2 + \frac{a_1 + e}{k}\left(\frac{1}{I_1} + \frac{1}{I_2}\right)s + \frac{a_0}{kI_1} = 0$$

This equation indicates that this type of control system functions like a damped pendulum that has an undamped natural frequency of $$f = \frac{1}{2\pi}\sqrt{\frac{a_0}{kI_1}}$$

and that has the relative damping ratio of $$d = \frac{a_1 + e}{\sqrt{ka_0/I_1}}\left(\frac{1}{I_1} + \frac{1}{I_2}\right)$$

This system, in the absence of the disturbing factors set forth above, is stable. Within its design parameters, a desirable loop frequency and damping ratio may be chosen.

The following invention is claimed:

1. In combination: a space vehicle, adapted for use in a spatial vacuum, having an axis about which its attitude may be controlled; an attitude-controlling rotary mass on the vehicle, exerting a reaction tending to turn the vehicle about said axis; electromotive means for rotating said mass; a source of electrical current; means electrically connecting said source of current with said electromotive means, comprising a current-controlling means; an adjustable device that is constructed and arranged to indicate a desired vehicle attitude and to provide an electric signal when the vehicle is not in said desired attitude; means to conduct said signal to said current-controlling means, said current-controlling means comprising a device influenced by said signal to vary the flow of current to said electromotive means in accordance with said signal; means responsive to the speed of said rotary mass comprising an electrical switching device that is actuated when said mass reaches a maximum speed; mechanism for expelling materials from said vehicle in a direction such as to cause a reaction of the vehicle about said axis and in an amount sufficient to prevent further substantial increase in the speed of said electromotive means and attitude-controlling mass; and means electrically connecting said mechanism with said switching device.

2. A device as set forth in claim 1, in which said electromotive means comprises a frictionless, contactless reactance commutator.

3. A device as set forth in claim 2, in which said impedance commutator is of the inductance type and in which said impedance device elements comprise coils fixed to said vehicle and said rotary impedance comprises a magnetic element supported by said rotary mass.

4. A device as set forth in claim 2, in which said impedance commutator comprises capacitance elements fixed to said vehicle and a cooperating capacitance element supported by said rotary mass in a position for periodically coming opposite each of said coils.

5. A device as set forth in claim 1, in which said electromotive means comprises a rotor having a permanent magnet and a stator comprising windings.

6. A device as set forth in claim 1, in which said electromotive means comprises hard, non-metallic, anti-friction bearings.

7. A device as set forth in claim 1, in which said source supplies direct current and said electromotive means utilizes direct current.

8. A device as set forth in claim 1, in which said electromotive means comprises a motor element having slots, and motor windings in said slots, and in which said means responsive to the speed of the rotary mass comprises an electrical generator.

9. A device as set forth in claim 8, in which said generator comprises windings in the slots in which said motor windings are located.

10. A device as set forth in claim 1, in which said source supplies direct current and in which said current-controlling means includes a controlled gate that comprises transistors and converts said direct current into alternating current.

11. A device as set forth in claim 10, in which said current-controlling means further comprises a transistorized amplifier.

12. A device as set forth in claim 10, in which said electromotive means has a frictionless, contactless reactance commutator, means electrically connecting said source and said commutator, and means electrically connecting the commutator and said controlled gate.

13. A device as set forth in claim 12, in which said means electrically connecting said source and commutator comprises an oscillator which supplies alternating current to the commutator.

14. A device as set forth in claim 1, in which said source comprises solar cells for converting solar energy into electric current.

15. A device as set forth in claim 1, in which said source comprises an atomic-energy-powered source of electric current.

16. A device as set forth in claim 1, in which said mechanism comprises a means for expelling solid masses of material from the vehicle.

17. A device as set forth in claim 1, in which said mechanism comprises a time delay and sequence device which controls the amount of materials and the sequence of pulses of expulsion of materials from the vehicle.

18. A device as set forth in claim 1, in which said rotary mass is a flywheel of electrically conductive material, having a radius and thickness which permit effective braking of the flywheel by eddy currents formed in it by magnetic fields existent outside said vehicle.

References Cited in the file of this patent
UNITED STATES PATENTS
2,857,122    Maguire _____ Oct. 21, 1958